(12) United States Patent
Ochotta et al.

(10) Patent No.: US 11,232,219 B1
(45) Date of Patent: Jan. 25, 2022

(54) PROTECTION OF ELECTRONIC DESIGNS

(71) Applicant: Xilinx, Inc., San Jose, CA (US)

(72) Inventors: Bin Ochotta, Mountain View, CA (US); Alec J. Wong, San Jose, CA (US); Nghia Do, San Jose, CA (US); Dennis McCrohan, Brier, WA (US); David A. Knol, Los Gatos, CA (US); Premduth Vidyanandan, Thornton, CO (US); Satyam Jani, San Jose, CA (US)

(73) Assignee: XILINX, INC., San Jose, CA (US)

( * ) Notice: Subject to any disclaimer, the term of this patent is extended or adjusted under 35 U.S.C. 154(b) by 373 days.

(21) Appl. No.: 16/264,101

(22) Filed: Jan. 31, 2019

(51) Int. Cl.
| | |
|---|---|
| *G06F 21/62* | (2013.01) |
| *H04L 9/08* | (2006.01) |
| *G06F 21/10* | (2013.01) |
| *G06F 21/76* | (2013.01) |
| *H04L 9/32* | (2006.01) |
| *G06F 21/60* | (2013.01) |
| *H04L 9/14* | (2006.01) |
| *G06F 21/64* | (2013.01) |
| *G06F 21/12* | (2013.01) |

(52) U.S. Cl.
CPC .......... *G06F 21/6209* (2013.01); *G06F 21/10* (2013.01); *G06F 21/121* (2013.01); *G06F 21/602* (2013.01); *G06F 21/6218* (2013.01); *G06F 21/64* (2013.01); *G06F 21/76* (2013.01); *H04L 9/0825* (2013.01); *H04L 9/14* (2013.01); *H04L 9/3242* (2013.01)

(58) Field of Classification Search
CPC .... G06F 21/6209; G06F 21/64; G06F 21/121; G06F 21/6218; G06F 21/602; G06F 21/76; G06F 21/10; H04L 9/14; H04L 9/3242; H04L 9/0825
See application file for complete search history.

(56) References Cited

U.S. PATENT DOCUMENTS

| | | | |
|---|---|---|---|
| 7,757,294 B1 | 7/2010 | Simkins | |
| 9,141,769 B1* | 9/2015 | Hitchcock | ............... G06F 21/10 |
| 9,152,794 B1 | 10/2015 | Sanders et al. | |
| 9,270,469 B2 | 2/2016 | Moore et al. | |
| 9,729,518 B1* | 8/2017 | Atsatt | ..................... G06F 21/10 |
| 2003/0149669 A1* | 8/2003 | Howells | .................. G06F 21/10 |
| | | | 705/51 |
| 2003/0154371 A1* | 8/2003 | Filipi-Martin | ........ H04L 9/3247 |
| | | | 713/153 |

(Continued)

OTHER PUBLICATIONS

IEEE Std 1735, "IEEE Recommended Practice for Encryption and Management of Electronic Design Intellectual Property (IP)", IEEE Computer Society, Sep. 23, 2015, 90 pages.*

*Primary Examiner* — Victor Lesniewski (74) *Attorney, Agent, or Firm* — Crawford Maunu PLLC (57) ABSTRACT

Removing protections on a session-key protected design include receiving a double encrypted vendor private key and an encrypted session key. The double encrypted vendor private key is decrypted into a single encrypted vendor-private key using a user private key, and the single encrypted vendor-private key is decrypted into a vendor private key using a vendor pass phrase. The encrypted session key is decrypted into a session key using the vendor private key, and the session-key protected design is decrypted into a plain design using the session key.

15 Claims, 4 Drawing Sheets

(56) References Cited

U.S. PATENT DOCUMENTS

| | | | |
|---|---|---|---|
| 2005/0071659 A1* | 3/2005 | Ferguson | H04L 9/0838 |
| | | | 713/193 |
| 2007/0055892 A1* | 3/2007 | Pikus | G06F 21/6227 |
| | | | 713/189 |
| 2007/0266248 A1* | 11/2007 | Cheng | H04L 9/00 |
| | | | 713/171 |
| 2007/0269041 A1* | 11/2007 | Bhatnagar | H04L 9/0825 |
| | | | 380/30 |
| 2009/0222927 A1* | 9/2009 | Pikus | G06F 30/398 |
| | | | 726/26 |
| 2013/0275736 A1* | 10/2013 | Kelley | G06Q 50/06 |
| | | | 713/1 |
| 2014/0043059 A1* | 2/2014 | Speers | H03K 19/003 |
| | | | 326/9 |
| 2014/0108786 A1* | 4/2014 | Kreft | G06F 21/335 |
| | | | 713/156 |
| 2017/0126642 A1* | 5/2017 | Basin | H04L 9/3247 |
| 2018/0060597 A1* | 3/2018 | Hakhinian | G06F 21/6209 |
| 2018/0091484 A1* | 3/2018 | Atta | H04L 9/3247 |
| 2018/0192287 A1* | 7/2018 | Ozzie | H04L 63/0428 |
| 2019/0149526 A1* | 5/2019 | He | H04L 9/0894 |
| | | | 713/168 |
| 2019/0165935 A1* | 5/2019 | Tehranipoor | H04L 9/0662 |
| 2019/0318102 A1* | 10/2019 | Araya | H04L 63/20 |
| 2019/0356529 A1* | 11/2019 | Gulati | H04L 9/3247 |

\* cited by examiner

PROTECTION OF ELECTRONIC DESIGNS

TECHNICAL FIELD

The disclosure generally relates to protection of electronic designs from unauthorized access.

BACKGROUND

System-level integration of electronic circuit designs often relies on reuse of previously created designs, from either within an enterprise or from a commercial vendor. Libraries of pre-developed blocks of logic have been developed that can be included in system circuit design. Such library modules include, for example, adders, multipliers, filters, and other arithmetic and DSP functions from which system designs can be readily constructed. The engineering community sometimes refers to these previously created designs as "design modules," "cores," "IP cores" (intellectual property cores), or "logic cores," and such terms are used interchangeably herein. The use of pre-developed logic cores permits faster design cycles by eliminating the redesign of circuits. Thus, using cores from a library may reduce design costs. Logic cores can include an optimally floor-planned layout targeted to a specific target device. Alternatively, a logic core can include source code or schematics that describe the logic and connectivity of a design.

Institute of Electrical and Electronics Engineers (IEEE) 1735 V2 cryptography standard provides an approach for protecting logic cores from unauthorized access, According to the IEEE 1735 V2 standard, a core vendor and a tool provider cooperate to provide protection against attacks on the logic core. A core vendor is a party providing a logic core to an end user to include in an electronic circuit design. The core vendor has an interest in protecting the logic core from attacks that can include theft of intellectual property embedded in the logic core or insertion of malicious code, such as a Trojan horse. A tool provider is a party who supplies an electronic design automation (EDA) tool to the end user for processing the logic core in combination with logic developed by the end user. An EDA tool may alternatively be referred to herein as a design processing tool.

In adhering to the IEEE 1735 V2 standard, the core vendor encrypts the logic core by a symmetric key (K), producing a data block. The vendor's public-private key pair is then used to protect K, producing a key block. The vendor delivers the encrypted data block and protected key (key block) to the end user. The tool provider makes the EDA tool available to the end user, and the EDA tool has access to the vendor's private key. To decrypt the protected logic core, the end user invokes the EDA tool and the EDA tool uses the tool provider's private key to decrypt the protected key and obtain the symmetric key K. The EDA tool then decrypts the logic core using K.

Though the IEEE 1735 V2 standard has been followed by many core vendors and tool providers, the standard does not provide failsafe protection. A report entitled, "Standardizing Bad Cryptographic Practice," by researchers at the University of Florida identified a number of vulnerabilities in the IEEE 1735 V2 standard. If successfully exploited, the vulnerabilities could result in theft of logic cores or corruption of designs, such as through the injection of Trojan horses or other malicious code.

SUMMARY

A disclosed method includes receiving in a memory of a user computer, a double encrypted vendor private key, an encrypted session key, and a session-key protected design. The method includes a design processing tool executing on a user computer processor obtaining a user private key and decrypting the double encrypted vendor private key into a single encrypted vendor-private key using the user private key. The method further includes the design processing tool decrypting the single encrypted vendor-private key into a vendor private key using a vendor pass phrase and decrypting the encrypted session key into a session key using the vendor private key. The design processing tool in performing the method decrypts the session-key protected design into a plain design using the session key and implements a circuit from the plain design.

Another disclosed method includes receiving a user public key, a vendor public key, and a vendor pass phrase in a memory of a computer system. The method includes a design processing tool executing on the computer system, encrypting a plaintext design using a session key by, resulting in protected design. The method further includes the design processing tool encrypting a vendor private key using the vendor pass phrase, resulting in a single encrypted vendor private key, and encrypting the session key by the design processing tool using the vendor public key into an encrypted session key. The design processing tool encrypts the single encrypted vendor private key into a double encrypted vendor private key using the user public key and generates a user-deliverable package. The user-deliverable package includes the encrypted session key, the double encrypted vendor private key and the protected design.

A disclosed system includes a processor and a memory arrangement. The memory arrangement is configured with instructions that when executed by the processor cause the processor to execute a design processing tool that performs operations including receiving in a memory of a user computer, a double encrypted vendor private key, an encrypted session key, and a session-key protected design. The design processing tool obtains a user private key and decrypts the double encrypted vendor private key into a single encrypted vendor-private key using the user private key. The design processing tool decrypts the single encrypted vendor-private key into a vendor private key using a vendor pass phrase and decrypts the encrypted session key into a session key using the vendor private key. The design processing tool decrypts the session-key protected design into a plain design using the session key and implements a circuit from the plain design.

Other features will be recognized from consideration of the Detailed Description and Claims, which follow.

BRIEF DESCRIPTION OF THE DRAWINGS

Various aspects and features of the methods and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

This disclosure describes improved approaches protecting electronic design data. Electronic design data (or "design" for brevity) includes logic cores, ranging from hardware description language source files, to netlists, to configuration bitstreams for programmable logic. Electronic design data also encompasses program source code and executable program code for microprocessors, graphics processing units (GPUs), central processing units (CPUs), digital signal processors (DSPs) etc. The design data can also include a combination of any of the foregoing files.

The disclosed approaches employ public-private key pairs of a design provider/vendor and an end-user, vendor and user pass phrases, and a symmetric key for protecting the design data. The following notation is used in the drawings and description to refer to the key pairs, pass phrases, and symmetric key. PU refers to a public key, and PR refers to a private key. The key pair of the vendor ("v") includes PUv and PRv; and the key pair of the end user ("u") includes PUu and PRu. PPv is the pass phrase associated with the vendor, PPu is the pass phrase associated with the user, and Ks is the symmetric key.

In the disclosed approaches for making a protected package, the plaintext design is encrypted by a symmetric key, Ks, which is also referred to herein as the session key. The vendor can encrypt the design using a design processing tool of a tool provider or can encrypt the design using a vendor tool. The design processing tool can then be used to construct a protected package for delivery to an end user. The design processing tool can encrypt the session key by the vendor's public key PUv. The resulting encrypted session key can be denoted PUv(Ks). The design processing tool encrypts the vendor's private key PRv by the vendor pass phrase PPv, resulting in a single encrypted vendor private key denoted PPv(PRv). The single encrypted vendor private key can then be encrypted by the user's public key PUu, resulting in a double encrypted vendor private key, referenced as PUu(PPv(PRv)). The design processing tool can then generate a package that is deliverable to the user. The package contains the encrypted session key PUv(Ks), the double encrypted vendor-private key PUu(PPv(PRv)), and the protected design Ks(design). The package can further include metadata and a hash message authentication code (HMAC) of the metadata. The metadata can be used to enforce distribution policies.

In the disclosed approaches for decrypting the protected package, the design processing tool, which can be executing on a user's computer system, receives the double encrypted vendor private key PUu(PPv((PRv)), the encrypted session key PUv(Ks), and the session key protected design Ks(design) (and optionally the metadata and HMAC). The design processing tool decrypts the double encrypted vendor private key PUu(PPt(PRv)) using the private key of the user, PRu, which can be protected by a user passphrase. The design processing tool then decrypts the single encrypted vendor private key (PPt(PRv)) using a vendor pass phrase. Having the vendor's private key, the design processing can then decrypt the encrypted session key PUv(Ks) by using PRv. Having the session key Ks, the design processing tool can then decrypt the protected design Ks(design). The decrypted design can then be used to implement the design, such as in a circuit or a programmed computer. If metadata and a corresponding HMAC are included in the protected package, the design processing tool can limit decryption based on the metadata.

In another aspect, the disclosed approaches can be used to assist in discovering the channel through which an unauthorized protected package is made available. For example, if a protected package is discovered on the Internet or a private server, key-based metadata in the package can be used to identify parties through whom the protected package may have been illegally obtained. In making the protected package, the design processing tool can include key-based metadata in the security envelope. The key-based metadata can identify the design and version, authorized end-user, and vendor. The key-based metadata is part of the digital envelop and it cannot be modified as it has an HMAC based on the metadata and the session key Ks. The metadata can further specify policies that the design processing tool can use to control and limit decryption of the design.

Figure 1:
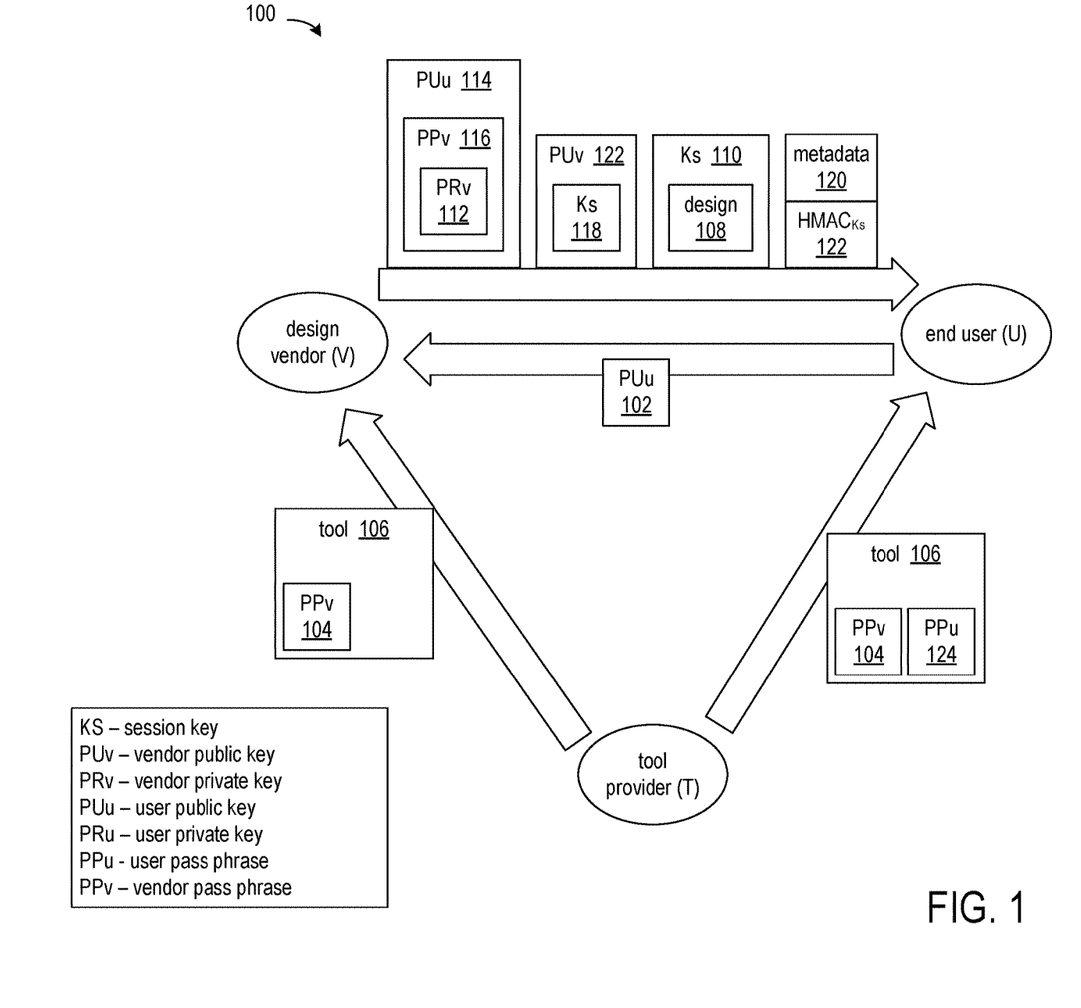
FIG. 1 shows a dataflow amongst a design vendor, an end user, and a tool provider in providing a protected design to the end user.

FIG. 1 shows a dataflow 100 amongst a design vendor, an end user, and a tool provider in providing a protected design to the end user. In an exemplary use case, the design vendor is the source of an electronic design, which the end user procures for use. The tool provider supplies the design processing tool 106 to the vendor for preparing a protected package having the vendor's design, and to the end user for processing the design into a functional circuit or for programming a computer.

The end user supplies its public key PUu 102 to the design vendor. The design vendor uses a vendor-generated session key Ks to protect the design and uses the public key PUu from the end user to prepare a protected package for the end user. The design vendor encrypts the plaintext design 108 by the session key Ks, which results in protected design 110 (Ks(design)). The vendor operating the design processing tool encrypts its private key PRv 112, first by a vendor pass phrase PPv and second by the user's public key PUu, resulting in double encrypted vendor private key 114 PUu (PPv(PRv)). The vendor pass phrase can be generated by the tool provider and configured as part of the design processing tool. The pass phrase can be any combination of letters, numbers, and or special characters of a desired length. The vendor also generates an encrypted session key 122 PUv (Ks) by encrypting the session key Ks 118 using its public key PUv, which results in an encrypted session key PUv (Ks). The vendor can also optionally prepare metadata 120 and an HMACKs 122 based on the metadata and the session key Once the vendor has protected the design, keys, and metadata, the vendor can prepare a protected package for delivery to the end user. The package can include the protected design 110, the double encrypted vendor private key 114, and the encrypted session key 122, metadata 120 and HMACKs 122. The package can be one or more files delivered via a network-connected server or on a computer-readable storage medium.

Upon receipt of the protected package, the end user can execute the design processing tool 106 to extract the design 108. The user can have previously provided its public key PUu to the vendor, which the vendor used to protect the vendor's private key PRv. The design processing tool 106 can be configured to include the vendor pass phrase PPv 104 and the user pass phrase PPu 124. To begin extraction, the design processing tool obtains the user's private key PRu by decrypting an encrypted version of the user's private key using the user pass phrase 124. The user pass phrase can be generated by the tool provider and configured as part of the design processing tool. The pass phrase can be any combination of letters, numbers, and or special characters of a desired length. Having the user's private key PRu, the design processing tool can decrypt the double encrypted vendor private key PUu(PPv(PRv)) 114, resulting in the single encrypted vendor private key PPv(PRv) 116. The design processing tool can be configured to include the vendor pass phrase 104, and the design processing tool can decrypt the single encrypted vendor private key PPv(PRv) 116 to obtain the vendor private key PRv 112 using the vendor pass phrase PPv 104. Using the vendor's private key PRv 112, the design processing tool decrypts the PUv-protected block 122, producing the session key Ks 118. Using the session key Ks 118, the design processing tool decrypts the protected design 110 to obtain the plaintext design 108. The user can then combine the plaintext design 108 with other user-provided design elements (not shown) and initiate additional functions of the design processing tool to implement a circuit or program a computer consistent with the plaintext design.

Figure 2:
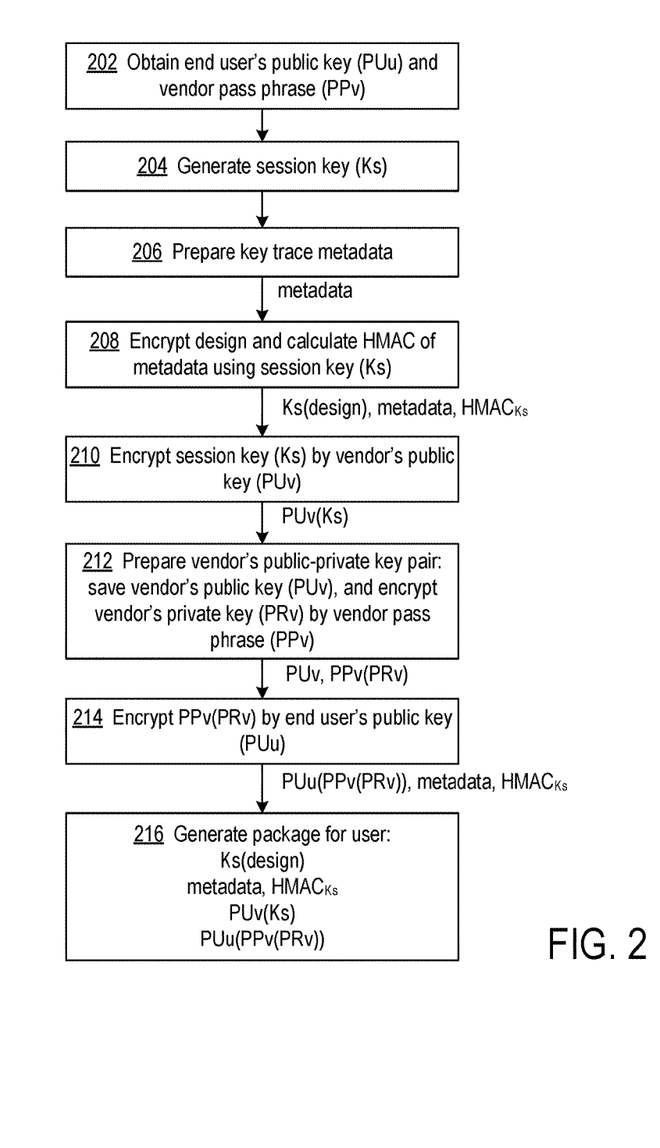
FIG. 2 shows a flowchart of an exemplary process performed in generating a protected package for delivery to a user.

FIG. 2 shows a flowchart of an exemplary process performed in generating a protected package for delivery to a user. The disclosed approaches employ asymmetric key cryptography, which involve public-private key pairs, pass phrases, and a symmetric key in protecting a design. Examples of asymmetric key approaches include the Diffie-Hellman key exchange protocol; DSS (Digital Signature Standard), which incorporates the Digital Signature Algorithm; ElGamal; various elliptic curve techniques; various password-authenticated key agreement techniques; the Paillier cryptosystem; RSA encryption algorithm (PKCS #1); the Cramer-Shoup cryptosystem; the YAK authenticated key agreement protocol etc. Examples of popular symmetric-key algorithms include Twofish, Serpent, AES (Rijndael), Blowfish, CAST5, Kuznyenchik, RC4, DES, 3DES, Skipjack, Safer+/++, IDEA etc.

The vendor's computer system can be specifically programmed to generate the protected design package by execution of one or more tools, which can be collectively referred to as a design processing tool. At block 202, the design processing tool obtains the end user's public key PUu and vendor pass phrase. The public key can be provided to the design processing tool by way of retrieval from the user's networked servers, via email, or via any other suitable channel.

At block 204, the design processing tool generates a symmetric session key Ks for encrypting the design. At block 206, the design processing tool prepares key trace metadata included with the protected package. The metadata can specify policies that restrict decrypting the design and/or document information that supports tracing the origin of suspicious protected packages. The metadata that specify a decryption policy can be evaluated at decryption time to determine whether or not and decryption of the protected package should be permitted or denied. The enforcement policy metadata can specify an authorized time period for which the vendor private key and vendor public key are valid, identify an authorized vendor, and/or specify an authorized version of the tool provider's design processing tool, for example. Metadata that can be useful in tracing the origin of a protected package appearing in a suspicious location or site can include data that identify the vendor, the name of the design, the version of the design, and the customer, for example.

At block 208, the design processing tool encrypts the design using the session key. The encrypted design is denoted as Ks(design). Also, the design processing tool calculates an HMAC of the metadata using the session key Ks. At block 210, the design processing tool encrypts the session key Ks by the tool provider's public key PUt, thereby producing the single-encrypted session key PUt (Ks).

At block 212, the design processing tool protects the vendor's private key PRv, by encrypting PRv by the vendor pass phrase PPv, resulting in the single encrypted vendor private key PPv(PRv). The design processing tool at block 214 encrypts the single encrypted vendor private key PPv (PRv) by the user's public key PUu, resulting in the double encrypted vendor private key PUu(PPv(PRv)).

The design processing tool generates a package for the user at block 216. The package can be one or more files that are made accessible to the user via network connection to the vendor's computer system or by delivery of a tangible computer-readable medium. The package includes the protected design Ks(design), key trace metadata, an HMAC of the metadata, the encrypted session key PUv(Ks), and the double-encrypted vendor private key PUu(PPv(PRv)).

Figure 3:
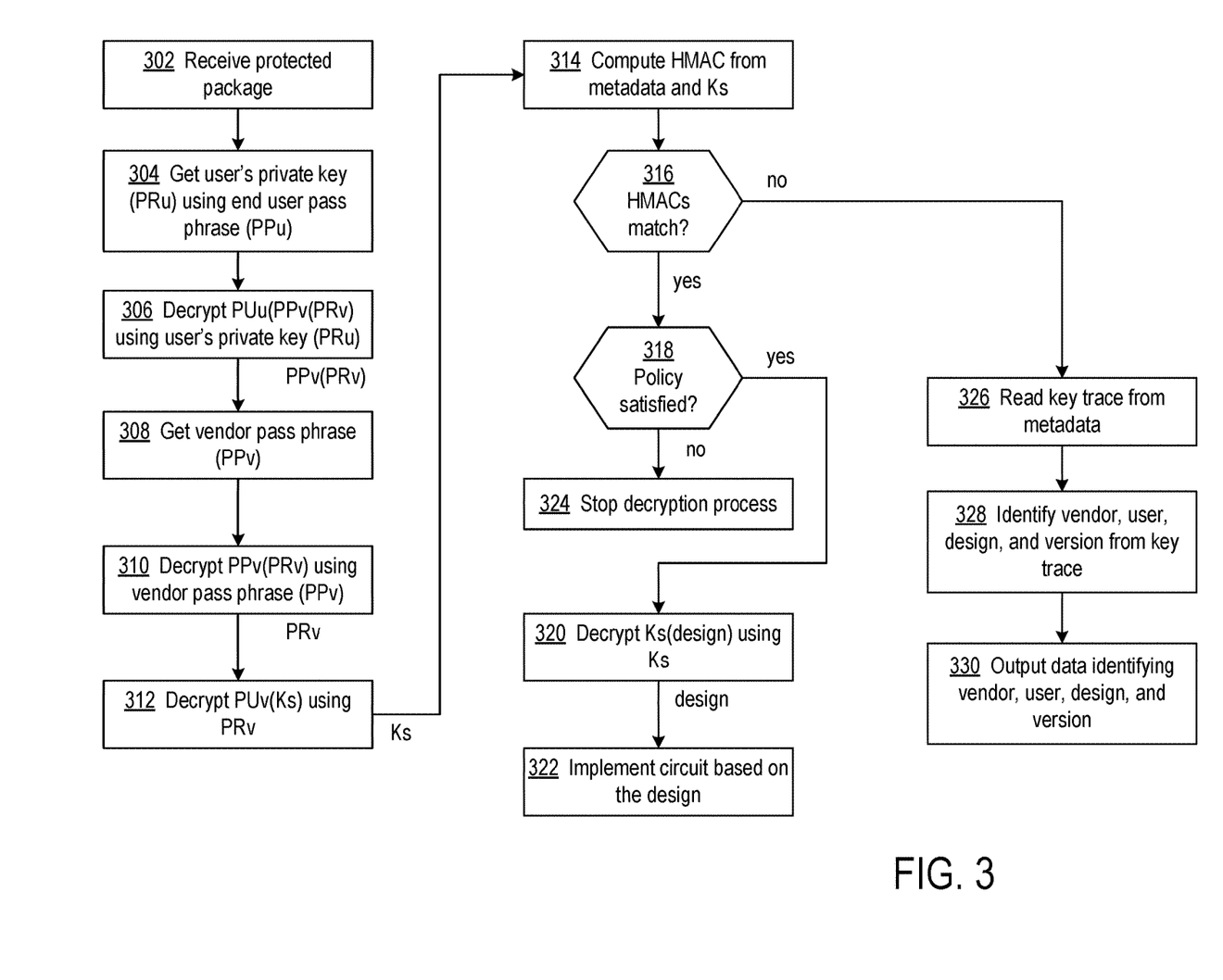
FIG. 3 shows a flowchart of a process of decrypting a protected package.

FIG. 3 shows a flowchart of a process of decrypting a protected package. At block 302, the user receives the protected package at the user's computer system, which can be either a virtual machine or a physical machine of the user. The user's computer system executes the tool provider's design processing tool, which obtains the user's private key PRu at block 304 by decrypting an encrypted version of the user's private key PPu(PRu) using a user pass phrase PPu. The user pass phrase can be embedded as a binary code in the executable design processing tool, for example. At block 306, the design processing tool decrypts the double encrypted vendor private key PPu(PPv(PRv)) using the user's private key PRu. At block 308, the design processing tool obtains the vendor pass phrase PPv. The vendor pass phrase can be embedded as a binary code in the executable design processing tool, for example. Using the vendor pass phrase, the design processing tool at block 310 decrypts the single encrypted vendor private key PPv(PRv) to obtain the vendor private key PRv. Using the vendor private key PRv, the design processing tool at block 312 decrypts the encrypted session key PUv(Ks) to obtain the session key Ks.

If enforcement metadata are employed, at block 314 the design processing tool computes the HMAC from the metadata and session key Ks. At decision block 316, the design processing tool compares the generated HMAC to the HMAC in the design package.

If the HMACs match, the design processing tool at decision block 318 determines whether or not a policy specified in the metadata is satisfied. For example, the design processing tool can determine whether or not an authorized time period for use of the vendor's key pair has expired, whether or not a vendor name associated with the vendor private key and vendor public key is authorized, and/or whether or not a version of the executing design processing tool is authorized.

In response to determining that the decryption is authorized, the design processing tool at block 320 decrypts the encrypted design Ks(design) using the session key Ks and obtains the plaintext design. The design processing tool performs operations to implement the design at block 322. Otherwise, in response to determining that the decryption is not authorized, the decryption process is stopped at block 324. The design provided by the vendor can be one component in a system having many other designs developed by the user or designs procured from other sources. The complete design can be prepared and processed by the tool provider's design processing tool and tools from other sources. The final implementation can be a circuit embodied in an application-specific (ASIC), a circuit embodied in a field programmable gate array, executable program code, or any combination of the foregoing. The tools can compile program code and/or perform synthesis, technology mapping, place-and-route, and generate configuration data from which an ASIC can be fabricated or an FPGA can be configured.

If at decision block 316 the design processing tool finds that the HMACs do not match, the design package is suspicious, and the design processing tool performs the processing of blocks 326, 328, and 330.

At block 326, the design processing tool reads key trace data from the metadata. As indicated above, the key trace information can identify the vendor, the name of the design, the version of the design, and the customer, for example.

At block 328, the design processing tool identifies the vendor, the name of the design, the version of the design, and the customer indicated by the key trace data. The key trace data can then be output by the design processing tool at block 330 to the vendor to support further investigation.

Figure 4:
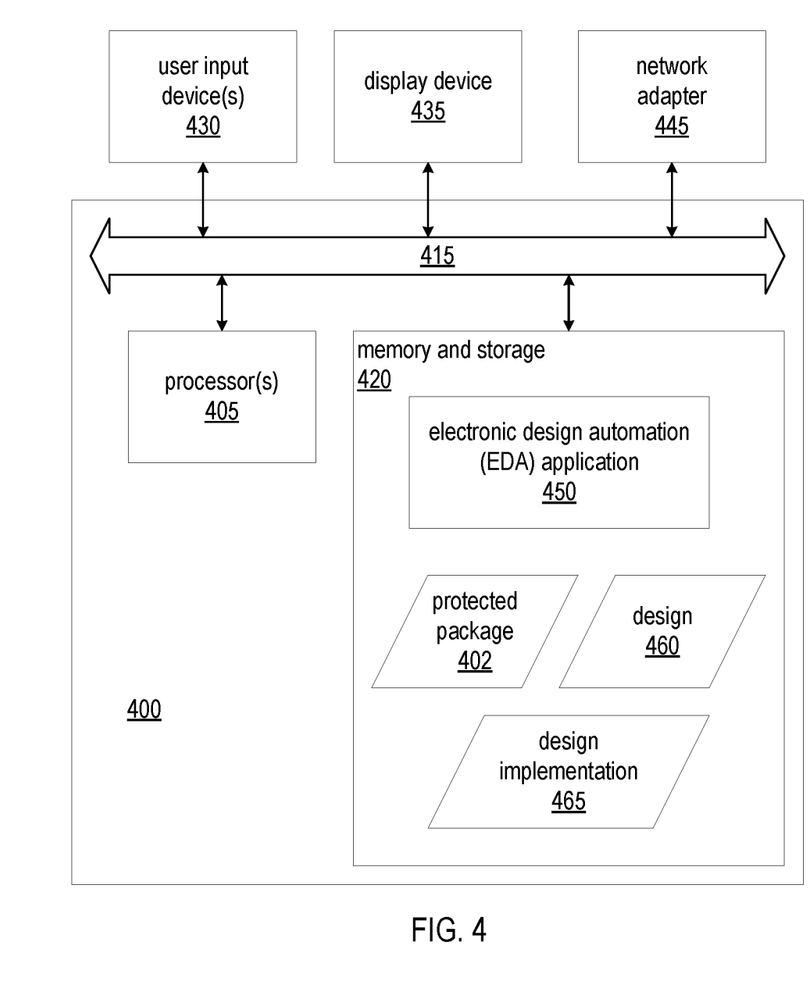
FIG. 4 is a block diagram illustrating an exemplary data processing system.

FIG. 4 is a block diagram illustrating an exemplary data processing system (system) 400. System 400 is an example of an EDA system. As pictured, system 400 includes at least one processor circuit (or "processor"), e.g., a central processing unit (CPU) 405 coupled to memory and storage arrangement 420 through a system bus 415 or other suitable circuitry. System 400 stores program code and protected package 402 within memory and storage arrangement 420. Processor 405 executes the program code accessed from the memory and storage arrangement 420 via system bus 415. In one aspect, system 400 is implemented as a computer or other data processing system that is suitable for storing and/or executing program code. It should be appreciated, however, that system 400 can be implemented in the form of any system including a processor and memory that is capable of performing the functions described within this disclosure.

Memory and storage arrangement 420 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 400 may also include one or more cache memories (not shown) that provide temporary storage of at least some program code and data in order to reduce the number of times program code and data must be retrieved from local memory and persistent storage during execution.

Input/output (I/O) devices such as user input device(s) 430 and a display device 435 may be optionally coupled to system 400. The I/O devices may be coupled to system 400 either directly or through intervening I/O controllers. A network adapter 445 also can be coupled to system 400 in order to couple system 400 to other systems, computer systems, remote printers, and/or remote storage devices through intervening private or public networks. Modems, cable modems, Ethernet cards, and wireless transceivers are examples of different types of network adapter 445 that can be used with system 400.

Memory and storage arrangement 420 may store an EDA application 450. EDA application 450, being implemented in the form of executable program code, is executed by processor(s) 405. As such, EDA application 450 is considered part of system 400. System 400, while executing EDA application 450, receives and operates on protected package 402. In one aspect, system 400 can perform the encryption and decryption operations described above and further perform a design flow on the vendor's design and any additional design components (not shown) provided by the end-user. The design flow may include synthesis, mapping, placement, routing, and/or compilation of program code. System 400 can generate a protected package 402 from system and/or circuit design 460, decrypt the protected package 402 and assemble a system and/or circuit design 460 from the decrypted protected package, and/or generate a design implementation 465.

EDA application 450, protected package 402, circuit design 460, and any data items used, generated, and/or operated upon by EDA application 450 are functional data structures that impart functionality when employed as part of system 400 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for protecting designs for electronic systems. Other aspects and features will be apparent to those skilled in the art from consideration of the specification. It is intended that the specification and drawings be considered as examples only, with a true scope of the invention being indicated by the following claims.

What is claimed is:

1. A method comprising:
    receiving in a memory of a user computer, a double encrypted vendor private key, an encrypted session key, a session-key protected design, and metadata specifying a time period for which a vendor key-pair that includes the vendor private key is valid;
    obtaining a user private key by a design processing tool executing on a user computer processor;
    decrypting the double encrypted vendor private key into a single encrypted vendor-private key by the design processing tool using the user private key;
    decrypting the single encrypted vendor-private key into a vendor private key by the design processing tool using a vendor pass phrase;
    decrypting the encrypted session key into a session key by the design processing tool using the vendor private key;
    determining from the metadata whether or not the time period specified in the metadata has expired;
    denying decrypting of the session-key protected design in response to determining that the time period has expired; and
    decrypting the session-key protected design into a plain design by the design processing tool using the session key in response to determining that the time period has not expired.

2. The method of claim 1, wherein the obtaining the user private key includes decrypting an encrypted user private key by the design processing tool using a user pass phrase.

3. The method of claim 1, further comprising:
determining whether or not a vendor associated with the vendor private key and vendor public key is authorized; and
denying decrypting of the session-key protected design in response to determining that the vendor is not authorized.

4. The method of claim 1, further comprising:
determining whether or not a version of the design processing tool is authorized; and
denying decrypting of the session-key protected design in response to determining that the version is not authorized.

5. The method of claim 1, wherein the receiving includes receiving in the memory a first hash message authentication code and the method further comprising:
generating a second hash message authentication code based on the metadata and the session key;
comparing the first hash message authentication code to the second hash message authentication code; and
denying decrypting of the session-key protected design in response to determining that the first hash message authentication code is not equal to the second hash message authentication code.

6. A method comprising:
receiving in a memory of a computer system a user public key, a vendor public key of a vendor key-pair, a vendor pass phrase, and metadata that specify a time period for which the vendor key-pair is valid, wherein the time period is testable at a time of decryption and permits or denies decryption of a user-deliverable package based on the time of decryption relative to the time period;
encrypting a plaintext design using a session key by a design processing tool executing on the computer system, resulting in protected design;
encrypting a vendor private key by the design processing tool using the vendor pass phrase, resulting in a single encrypted vendor private key;
encrypting the session key by the design processing tool using the vendor public key into an encrypted session key;
encrypting the single encrypted vendor private key into a double encrypted vendor private key by the design processing tool using the user public key; and
generating the user-deliverable package by the design processing tool, the user-deliverable package including the encrypted session key, the double encrypted vendor private key, the protected design, and the metadata.

7. The method of claim 6, further comprising:
wherein the metadata specify a policy that is testable at decryption time and permits or denies decryption of the user-deliverable package, and the policy includes the time period;
generating by the design processing tool, a hash message authentication code based on the metadata and the session key; and
including the hash message authentication code in the user-deliverable package.

8. The method of claim 7, wherein the policy includes enforcement data that identifies an authorized vendor.

9. The method of claim 7, wherein the policy includes enforcement data that specifies an authorized version of the design processing tool.

10. The method of claim 7, wherein the policy includes first data that identifies the plain design and second data that identifies a user associated with the user public key.

11. The method of claim 10, wherein the policy includes a third data that identifies a vendor associated with the vendor public key.

12. The method of claim 11, wherein the policy includes third data that identifies a version of the plain design.

13. A system comprising:
a processor; and
a memory arrangement coupled to the processor and configured with instructions that when executed by the processor cause the processor to execute a design processing tool that performs operations including:
receiving a double encrypted vendor private key, an encrypted session key, a session-key protected design, and metadata specifying a time period for which a vendor key-pair that includes the vendor private key is valid;
obtaining a user private key;
decrypting the double encrypted vendor private key into a single encrypted vendor-private key using the user private key;
decrypting the single encrypted vendor-private key into a vendor private key using a vendor pass phrase;
decrypting the encrypted session key into a session key using the vendor private key;
determining from the metadata whether or not the time period specified in the metadata has expired;
denying decrypting of the session-key protected design in response to determining that the time period has expired; and
decrypting the session-key protected design into a plain design using the session key in response to determining that the time period has not expired.

14. The system of claim 13, wherein the instructions for obtaining the user private key include instructions for decrypting an encrypted user private key using a user pass phrase.

15. The system of claim 13, wherein:
the instructions for receiving include instructions for receiving a first hash message authentication code; and
the memory arrangement is further configured with instructions that when executed by the processor cause the processor to perform operations including:
generating a second hash message authentication code based on the metadata and the session key;
comparing the first hash message authentication code to the second hash message authentication code; and
denying decrypting of the session-key protected design in response to determining that the first hash message authentication code is not equal to the second hash message authentication code.

* * * * *